Figure 4:
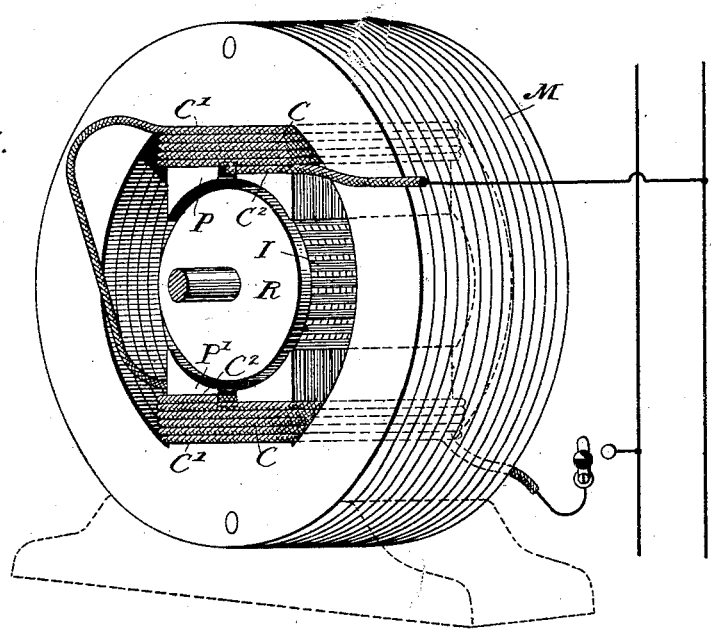

(No Model.) 3 Sheets—Sheet 1.
W. STANLEY, Jr.
ALTERNATING CURRENT MOTOR.
No. 522,356. Patented July 3, 1894.
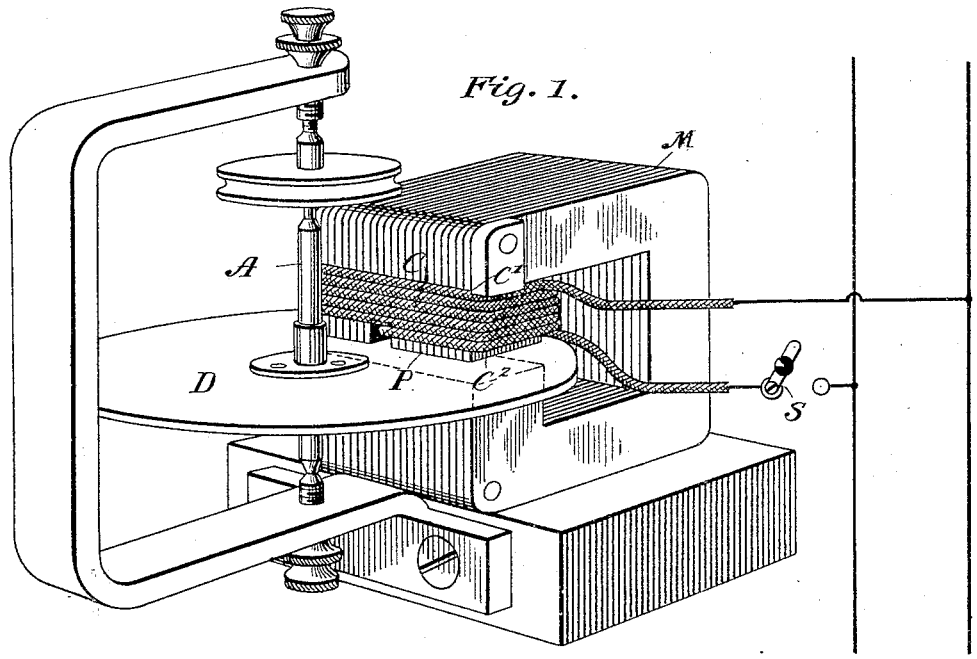
Fig. 1.
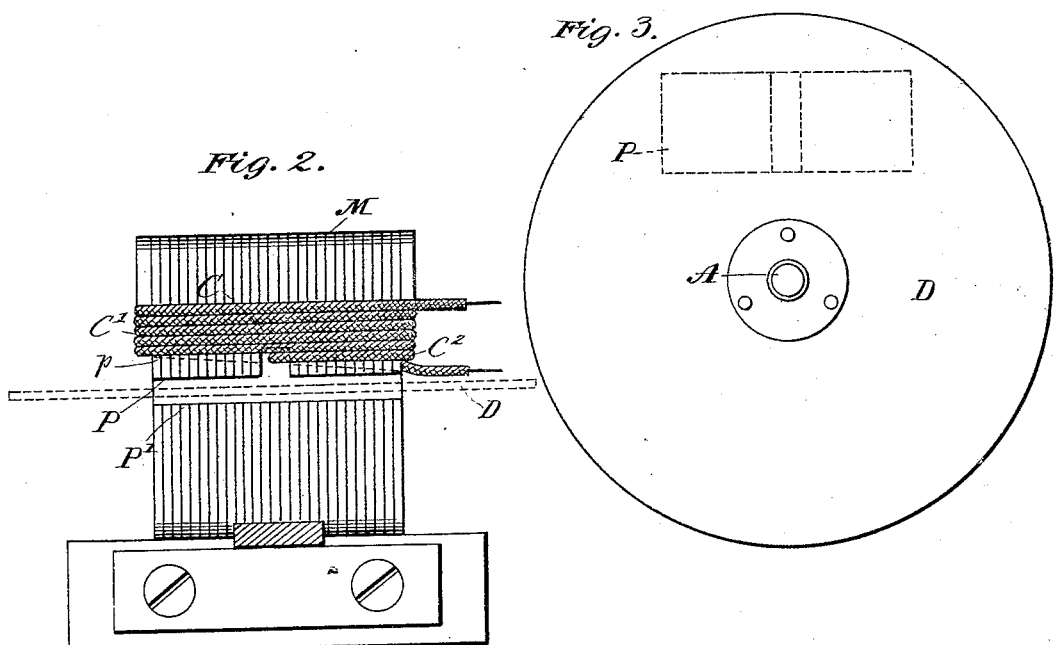
Fig. 2.
Fig. 3.
WITNESSES:
Frank S. Ober
C. R. Lohse
INVENTOR
William Stanley Jr
BY H. B. Brownell
ATTORNEY (No Model.) 3 Sheets—Sheet 2.

W. STANLEY, Jr.
ALTERNATING CURRENT MOTOR.

No. 522,356. Patented July 3, 1894.

WITNESSES:
Frank S. Ober
C. R. Lohse

INVENTOR
William Stanley Jr.
BY
H. B. Brownell
ATTORNEY (No Model.) 3 Sheets—Sheet 3.

W. STANLEY, Jr.
ALTERNATING CURRENT MOTOR.

No. 522,356. Patented July 3, 1894.

Fig. 3.ª

WITNESSES:
Frank S. Ober
C. R. Lohse

INVENTOR
William Stanley Jr
BY H. B. Brownell
ATTORNEY

UNITED STATES PATENT OFFICE.

WILLIAM STANLEY, JR., OF PITTSFIELD, MASSACHUSETTS, ASSIGNOR TO THE STANLEY LABORATORY COMPANY, OF SAME PLACE.

ALTERNATING-CURRENT MOTOR.

SPECIFICATION forming part of Letters Patent No. 522,356, dated July 3, 1894.

Application filed April 2, 1894. Serial No. 506,086. (No model.)

*To all whom it may concern:*

Be it known that I, WILLIAM STANLEY, Jr., a citizen of the United States, residing at Pittsfield, county of Berkshire, and State of Massachusetts, have invented certain new and useful improvements in methods of producing continuous motion by alternating currents and certain new and useful improvements in alternating-current motors for carrying out said methods, of which the following is a specification.

My inventions relate to the art of producing continuous motion by electric currents and to the class of apparatus known as alternating current motors, and have for their objects to provide a method of and means for transforming the energy of a single alternating current into mechanical energy in the form of continuous rotary motion, without the use of commutators or other similar devices, and without the use of any modifier of the magnetic or electrical phases of the magnetic field or of the exciting current, or of the use of any auxiliary circuit or starting device.

My method consists in producing mechanical motion in the manner hereinafter described, and will be disclosed in connection with the description of my motor which consists essentially of a field magnet which, when energized by an alternating current, produces an asymmetrical field of single or uniform phase, together with a suitably mounted armature bearing a conducting system in which currents are induced by the asymmetrical field. The asymmetrical field has hitherto been produced by varying the reluctance of the magnetic circuit. I have, however, discovered that it can be advantageously produced by varying the magneto-motive force upon one side of the field magnet and that this can be done by placing more windings of the energizing circuit upon that side than upon the other, and also, that the asymmetrical field can be produced either by this means alone, the reluctance in the magnetic circuit being uniform, or that the varying magneto-motive force may be used in connection with a varying reluctance, in which case the asymmetrical field is the resultant of the action of the varying reluctance in the magnetic circuit and of the varying magneto-motive force resulting from the additional windings.

The motor may be described as follows, reference being had to the accompanying drawings, in which—

Figure 5:
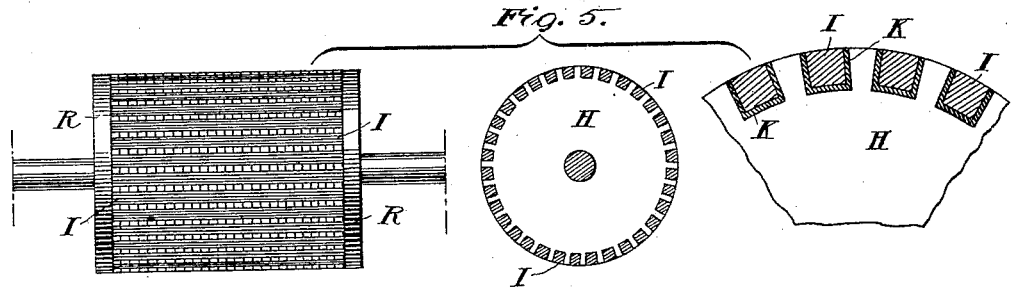
Figure 6:
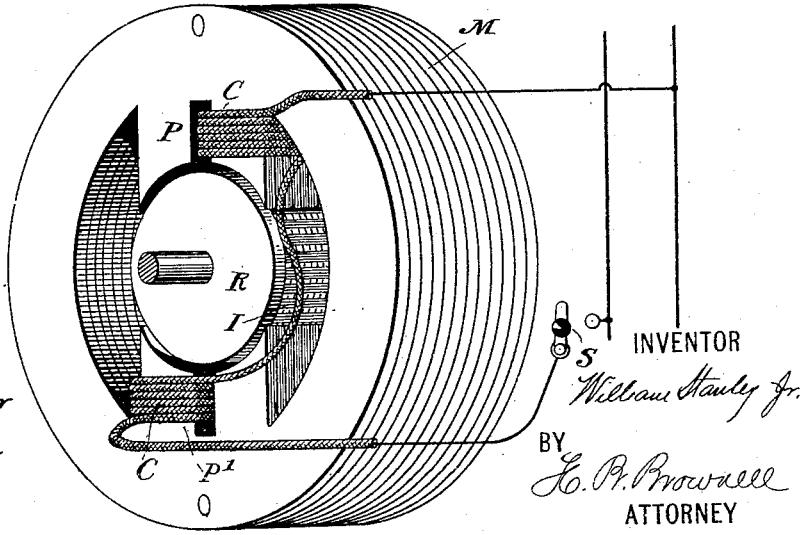
Figure 7:
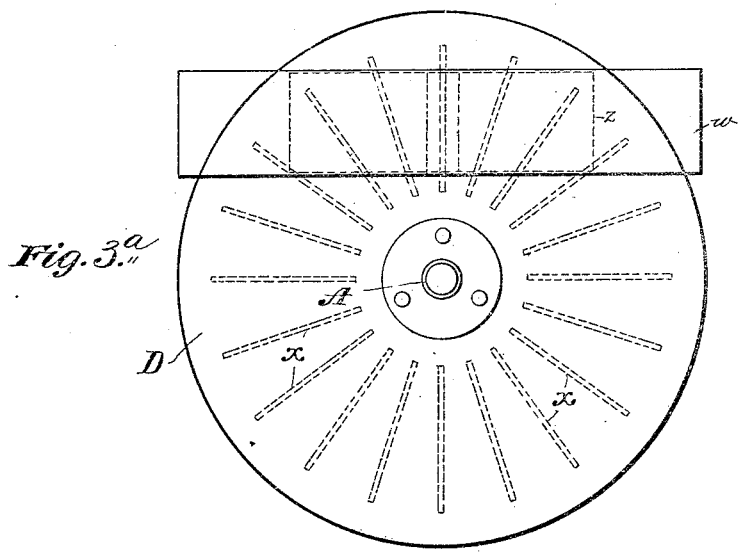
Figure 7:
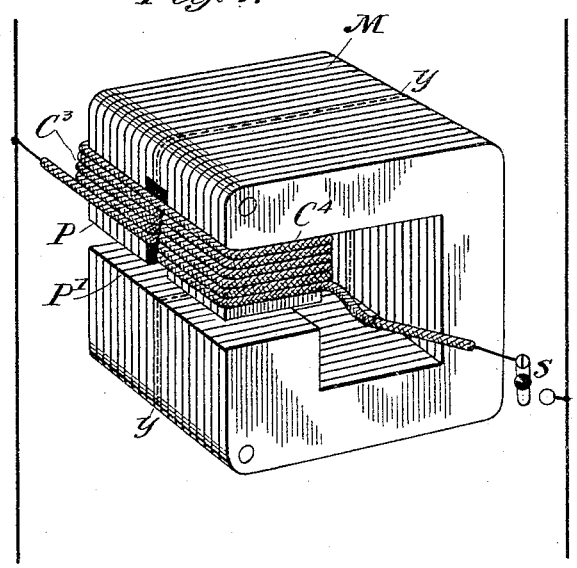
Figure 8:
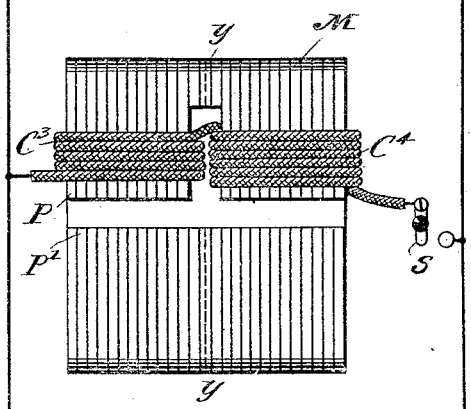

Figure 1 is a perspective view of a motor embodying my improvement in which a disk armature is used. Fig. 2 is a front elevation of the magnet of the same. Fig. 3 is a projection of the pole piece upon the disk. Fig. 3$^a$ is a projection showing a modification of the disk and pole piece. Fig. 4 is a perspective view of a motor embodying my improvement in which a cylindrical armature is used. Fig. 5 shows an elevation of the cylindrical armature and a cross section of the same, and an enlarged detail. Fig. 6 shows a modification of the winding of the field magnet, and Figs. 7 and 8 show further modifications of details.

In the drawings M represents a laminated field magnet, the pole pieces P, P', of which are brought face to face; C an exciting coil connected with a source of alternating current; D a conducting system or armature supported by a suitably mounted axis A so as to lie between the pole pieces and be free to rotate.

In Figs. 1, 2 and 4 the exciting coil C is made up of two parts, one of which surrounds the entire pole of the field magnet as at C', while the other, which is a continuation of the first, surrounds but a part thereof as at C$^2$. The corresponding pole of the magnet may be, but is not necessarily, wound in the same way. The poles of the magnet are wound so that as the armature revolves it rotates always from the parts which are wound alike toward the other parts.

Upon the passage of an alternating current through the exciting coil C the field magnet becomes energized and an alternating magnetic field of single or uniform phase produced, the magnetic flux being from one pole piece to the other. By reason of the additional winding, a greater magneto-motive force is produced in the part having such additional winding than in the other part, resulting in a greater magnetic flux from that part; that is, the alternating magnetic field is more strong or dense on the side of that part, or, as we may say, the magneto-motive force and the magnetic flux of the magnet so constructed, when energized, is asymmetrical and the magnet produces an asymmetrical alternating magnetic field by which it is to be understood that the distribution of magneto-motive force and of flux is not the same on both sides of the center of a cross-section of the field magnet or of the figure of the magnetic field. The action of the asymmetrical field upon the conducting system lying within it is to induce currents therein which reacting upon the inducing field tend to produce motion.

The field magnets, as shown, are so constructed that the air-gap in the magnetic circuit between their pole pieces is substantially uniform. In such a case, the asymmetrical field is due entirely to the windings. The pole pieces, especially in the construction shown in Figs. 1 and 2 may, however, be cut, (as shown by the dotted line $p$ in Fig. 2) so as to make the air-gap wedge-shaped, in which case the wedge-shaped air-gap of itself tends to produce an asymmetrical field, and the asymmetrical field actually produced is the resultant of a variation in the reluctance of the magnetic circuit by reason of the air-gap and the variation in the magneto-motive force by reason of the additional windings.

When the induced system is in the form of a disk and extends beyond the strong side of the pole, the relative motion of the induced system is from the weak to the strong side of the pole, and is due to the fact that one limb of the current induced in the disk lies well without the strong side of the pole while the other limb lies for the most part beneath the pole. If now, the induced system is symmetrical about an axis upon which it is mounted so as to be free to rotate under the action and reaction of the induced currents, as shown, the result is that the symmetrical induced system always presents a conductor of unchanging form to the inducing field so that the induced currents at the various stages of the alternations always bear the same relation to that field resulting in a continuous movement. If, however, the pole pieces are broadened so as to extend beyond the induced disk, as shown in full lines $w$ in Fig. $3^a$, the currents induced in the disk do not form outside of the inducing field, as they would otherwise do. The result is that both limbs of the induced currents lie beneath the pole of the field magnet and the action is such as to produce a relative rotation in the direction from the strong and toward the weak side of the pole. This action is even more pronounced if the disk is slotted radially at frequent intervals, as shown in dotted line $x$ in Fig. $3^a$. The disk even when slotted is substantially symmetrical in all respects as to its axis, so that there is a continuous unchanging conductor within the inducing field. When the disk is slotted, the pole pieces may be narrower, so as not to extend up to the edge of the disk, as shown in dotted lines $z$ in Fig. $3^a$. This motion from the strong and toward the weak side of the field is due to the fact that both limbs of the currents are substantially within the field, but are not in parts of equal strength, and the limb lying in the strongest part prevails.

In Figs. 4, 5 and 6 I have shown a construction in which the induced conductor of the armature is substantially cylindrical in form. The armature is made up of a cylindrical core H of laminated iron in the periphery of which are grooves containing bars I of copper or other good conductor at frequent intervals and parallel to the axis of the core. These bars are electrically connected at their ends by a ring or disk R and preferably insulated from the core as at K. By placing the bars at frequent intervals in grooves in the laminated iron core, the effect is that of a cylindrical conductor which does not materially increase the reluctance in the magnetic circuit. The poles or pole pieces P P' of the magnet, shown in Figs. 4, 5 and 6, so far as is mechanically possible, conform to the shape of the cylindrical armature so that the air-gap in the magnetic circuit through the armature is substantially uniform. The pole pieces of the magnet shown in Fig. 4 are wound so that part of the coil embraces the whole pole and part embraces but a portion thereof. The parts with the additional winding are always on the same side relatively to the movement of the armature.

When an alternating current passes through the energizing coils of the field magnet an alternating asymmetrical field of single or uniform phase is produced as above described which induces currents in the conductor of the armature causing the same to rotate from the weak and toward the strong side of the field.

In Fig. 6, I have shown the poles with a winding on one side only. In such a case lines of force pass, part through the whole magnetic circuit returning through another pole piece, and part to the unwound portion of the pole returning without passing through another pole piece. In such case, the portion of the pole piece which is unwound will be not only weaker than the wound portion but will be of opposite polarity. Upon the passage of an alternating current, through the energizing coils of a motor wound so as to make the sides of the field of different polarity and different magnetic density the reaction of the induced currents upon the inducing field is such as to make the induced system move relatively toward the weaker side.

In the case of any of the poles of the field magnets above described, it will be seen that the average center of the windings or energizing coils on any one compound pole taken altogether does not coincide with the center of the figure of their pole piece and that when the magnets are energized the magneto-motive force is asymmetrical with relation to the figure of the pole pieces, by which I mean the center of the magneto-motive force does not correspond with the center of the figure of the pole, and this results in the asymmetrical magnetic field. Instead of having one coil energize both parts of the core of the field magnet, as in the construction shown in Fig. 1, the two parts may each have their own coils, $C^3$, $C^4$, as shown in Figs. 7 and 8, in which case the coil $C^4$ being the larger produces in the part embraced by it a higher magneto-motive force than is produced in the other part, resulting in a greater strength for that side of the field on which it is. The parts of the cores of the constructions shown in Figs. 4, 5 and 6 may be correspondingly wound.

When the field magnet core is of the form shown in Figs. 1, 2, 7 and 8, with both parts embraced by windings the whole core may be divided along its center, as shown by the dotted line $y$, with advantage, since thus the two fluxes become better defined. When not so defined, the flux on the weak side in the construction shown in Fig. 7, may be determined as to its sign by the magnetizing force of the strong side; that is to say, when the magnetizing force on the strong side is very great the conditions are substantially as in Fig. 6.

In Fig. 7 the parts of the core are so wound that they are of like polarity but of unequal magnetic strength, the coils being in series.

In Fig. 8 the parts of the core are of unequal polarity and unequal strength, the coils being in series.

From the above description it will be seen that I obtain continuous motion by producing in the field magnet by an alternating current an asymmetrical magneto-motive force of alternating polarity and of single or uniform phase, and by such asymmetrical magneto-motive force producing an asymmetrical alternating magnetic field of single or uniform phase, and by such field inducing currents in a conducting system mounted symmetrically about an axis around which the field magnet or the conducting system is free to rotate under the action of the inducing field and the induced currents.

I do not desire to limit myself to any particular construction shown or to the precise method or means above described for producing in an asymmetrical-field-induction motor the asymmetrical magnetic field by varying the magneto-motive force, but What I desire to claim as my invention and to secure by Letters Patent is as follows:

1. An alternating current motor consisting of a field magnet in which, when energized by an alternating current, the magneto-motive force is asymmetrical and of uniform phase producing an asymmetrical field, of uniform phase, in combination with a conducting system symmetrical about an axis around which one of the members is free to rotate, substantially as described.

2. An alternating current motor consisting of a field magnet the energizing coils of which do not coincide as to their average center with the center of the figure of their pole piece and the field of which, when energized, is of single or uniform phase, in combination with an induced system symmetrical about an axis around which one of the members is free to rotate, substantially as described.

3. An alternating current motor consisting of a field magnet having a greater number of windings of the energizing coil upon one side than upon the other, all traversed by currents of the same phase and also having a field of uniform phase, in combination with an induced system mounted symmetrically to an axis about which one of the members is free to rotate, substantially as described.

4. The method of producing continuous motion by alternating currents which consists in producing in a field magnet by an alternating current an asymmetrical magneto-motive force of alternating polarity, by such asymmetrical magneto-motive force producing an asymmetrical alternating magnetic field, and by such field of uniform phase inducing currents in a conducting system mounted symmetrically about an axis around which either the field magnet or the conducting system is free to rotate under the action of the inducing field and the induced currents, substantially as described.

In witness whereof I have hereunto set my hand this 30th day of March, 1894.

WILLIAM STANLEY, Jr.

Witnesses:
L. W. BAUM,
EDWARD HINES.